US011829505B2

(12) United States Patent
Wisgo

(10) Patent No.: US 11,829,505 B2
(45) Date of Patent: Nov. 28, 2023

(54) HIGH SECURITY ONE-TIME ENCRYPTION

(71) Applicant: Citrix Systems, Inc., Fort Lauderdale, FL (US)

(72) Inventor: Jeffrey David Wisgo, King City, OR (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 86 days.

(21) Appl. No.: 17/481,809

(22) Filed: Sep. 22, 2021

(65) Prior Publication Data

US 2023/0108423 A1    Apr. 6, 2023

(51) Int. Cl.
*H04L 9/08* (2006.01)
*G06F 21/62* (2013.01)
*H04L 9/14* (2006.01)
*H04L 9/40* (2022.01)

(52) U.S. Cl.
CPC ........ *G06F 21/6227* (2013.01); *H04L 9/0819* (2013.01); *H04L 9/0866* (2013.01); *H04L 9/14* (2013.01); *H04L 63/068* (2013.01); *H04L 63/108* (2013.01); *H04L 63/067* (2013.01)

(58) Field of Classification Search
CPC ....... H04L 9/08; H04L 9/0819; H04L 9/0861; H04L 9/0891; H04L 9/088; H04L 9/14; H04L 9/16; H04L 63/06; H04L 63/068; H04L 63/062; G06F 21/62; G06F 21/6227; G06F 21/6281
See application file for complete search history.

(56) References Cited

U.S. PATENT DOCUMENTS

| | | | |
|---|---|---|---|
| 11,240,023 B1* | 2/2022 | Donlan | H04L 9/088 |
| 2013/0114812 A1* | 5/2013 | Gidwani | H04L 9/083 380/255 |
| 2014/0229739 A1* | 8/2014 | Roth | G06F 21/6218 713/189 |
| 2017/0279618 A1 | 9/2017 | Kent | |
| 2018/0145835 A1 | 5/2018 | Barbour et al. | |
| 2021/0049285 A1* | 2/2021 | Vedantham | H04L 63/0428 |

FOREIGN PATENT DOCUMENTS

WO    2017131788 A1    8/2017

* cited by examiner

*Primary Examiner* — Shaqueal D Wade-Wright

(57) ABSTRACT

Methods and systems for improved and novel encryption that make it difficult or impossible in any practical way to extract data that has been protected on the computing system. A computing device may receive authentication data from a client device. The computing device may generate an encryption key and a corresponding decryption key. The computing device may receive, from the client device, information associated with a timed access window. The computing device may send, to the client device, the encryption key. The computing device may receive, from the client device, a request for the corresponding decryption key. The computing device may calculate that the request for the corresponding decryption key is during the timed access window and send, to the client device, based on the request and the calculation that the request for the corresponding decryption key is during the timed access window, the corresponding decryption key.

20 Claims, 8 Drawing Sheets

HIGH SECURITY ONE-TIME ENCRYPTION

FIELD

Aspects described herein generally relate to computer networking, remote computer access, encryption, enterprise mobility management, and hardware and software related thereto. More specifically, one or more aspects describe herein provide for encryption protocols that result in high security file encryption.

BACKGROUND

Computing systems such as desktops, laptops, and mobile devices utilize some type of encryption for storing sensitive data. Such computing system utilize various techniques and methods to prevent untrustworthy sources from accessing or extracting important data from lost, stolen, or comprised devices. This can be a critical part of enterprise level security. Many common solutions to such security rely on either a password that can be guessed or compromised or a security key that may be stored in short and/or long term storage of a lost, stolen, or comprised device and potentially exposed.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards improved and novel encryption systems that make it difficult or impossible in any practical way to extract data that has been protected on a computing system. A special encryption system is described such that even if a device is lost or stolen, it would be extremely difficult to extract any secret, important, or critical information.

In some examples, a computing device may receive authentication data from a client device. The computing device may generate an encryption key and a corresponding decryption key. The computing device may receive, from the client device, information associated with a timed access window. The computing device may send, to the client device, the encryption key. The computing device may receive, from the client device, a request for the corresponding decryption key. The computing device may calculate that the request for the corresponding decryption key is during the timed access window and send, to the client device, based on the request and the calculation that the request for the corresponding decryption key is during the timed access window, the corresponding decryption key.

In some examples, the computing device, based on sending the corresponding decryption key, may generate a second encryption key and a corresponding decryption key, send, to the client device the second encryption key, and delete any remaining copies of the encryption key and the corresponding decryption key from short term memory and long term storage of the computing device. The computing device may receive, from the client device, information associated with a second timed access window.

In some examples, the timed access window is negotiated between the computing device and the client device.

In some examples, the computing device may delete any remaining copies of the encryption key after expiration of the timed access window.

In some examples, a plurality of timed access windows, including the timed access window, are negotiated between the computing device and the client device, (b) the plurality of timed access windows are associated with a same set of data, and (c) the computing device is configured to accept the request for the corresponding decryption key during any of the plurality of timed access windows.

In some examples, the computing device generates a plurality of corresponding sets of encryption keys and decryption keys, including the encryption key and the corresponding decryption key. The plurality of corresponding sets of encryption keys and decryption keys may be associated with a same set of data. The computing device, based on sending the corresponding decryption key, may delete any remaining copies of the plurality of corresponding sets of encryption keys and decryption keys from short term memory and long term storage of the computing device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

Figure 1:
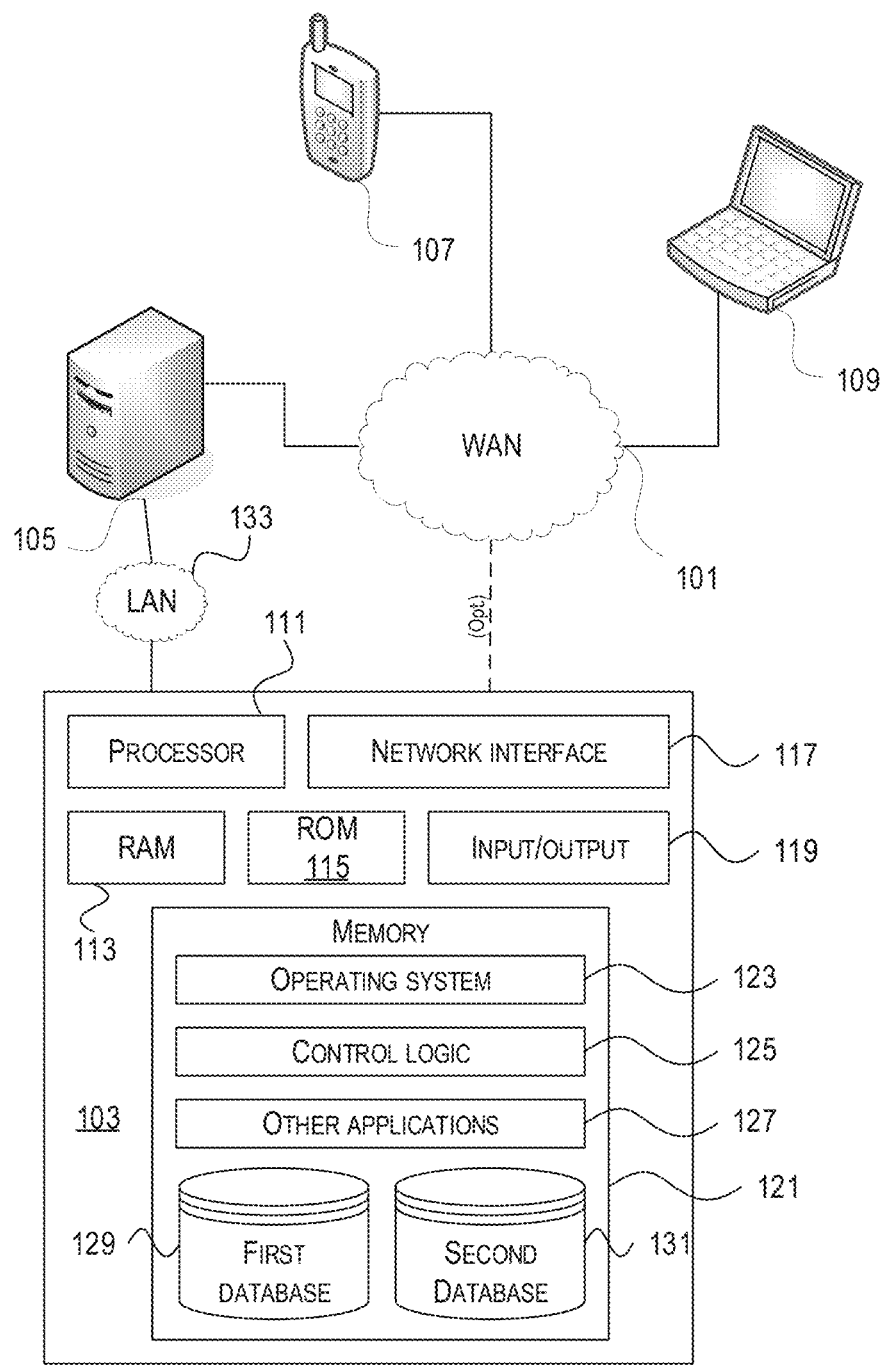
FIG. 1 depicts an illustrative computer system architecture that may be used in accordance with one or more illustrative aspects described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards improved and novel encryption systems that make it difficult or impossible in any practical way to extract data that has been protected on the computing system. Aspects are further described herein directed towards special encryption keys to protect data in such a way as to make hacking of or otherwise unauthorized access to the data very difficult. In some implementations, the client device or device of the owner of the data does not have ability to decrypt the protected data as a matter of course. The device only has access to decryption methods for accessing the data for brief periods of processing. In some implementations, the data is also never sent off the device. Access to the data is accomplished through interaction with one or more servers that periodically provide decryption information allowing for decryption of the encrypted data.

In some implementations, a client device associated with a client or user is used to encrypt some data for protection. The client device may contact a server and authenticate itself via a username and password or other known method of authentication. The server may generate encryption and decryption keys (e.g., an asymmetric key pair) and send only the encryption key the client device. As part of the interaction, one or more access windows may be determined. The one or more access windows may be determined by the client device, the server device, negotiated between the two or more devices or set by configuration or by policy. The client device, having received the encryption key and knowing the one or more access windows, encrypts all the data that needs protection, stores the encrypted data to data storage and erases all traces of the unencrypted version of the data. When the client device needs to use the data again, the client device must wait until the access window is active and request the decryption key from the server. The client device may have to reauthenticate to request the decryption key. As long as the client device is appropriately accessing and requesting from the server during the access window, the server provides the decryption key to the client device. The server also creates a new set of keys and again sends only the encryption key along with redetermining the next set of access windows. The server erases the first set of encryption and decryption keys from memory and data storage. The server may erase the keys after all access windows have expired even if the client device never contacted the server for the decryption key. The client, upon proper request of the decryption key, uses the decryption key to decrypt the encrypted data. After using the decrypted data, the client device again encrypts any data to be protected with the new encryption key. The client devices overwrites or erases the first instance of encrypted data. The client device may have only worked on the decrypted data in memory without ever having written it to disk or any form of more permanent storage. In some implementations, the client device may be limited in the amount of time it has to use the data. This may be a configuration or policy setting. The configuration or policy setting may be obtained from the server or set directly in the client device. These security access steps may be repeated as necessary until the data is no longer need at which point it may be removed from the client device.

In some implementations, the critical data is never present on a client device in a persistent form and is only in memory for a limited time. The data may be present on the client device for a majority of the time encrypted with a key that the client device does not have access too except for windows of time when the data is being used.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

Computing Architecture

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
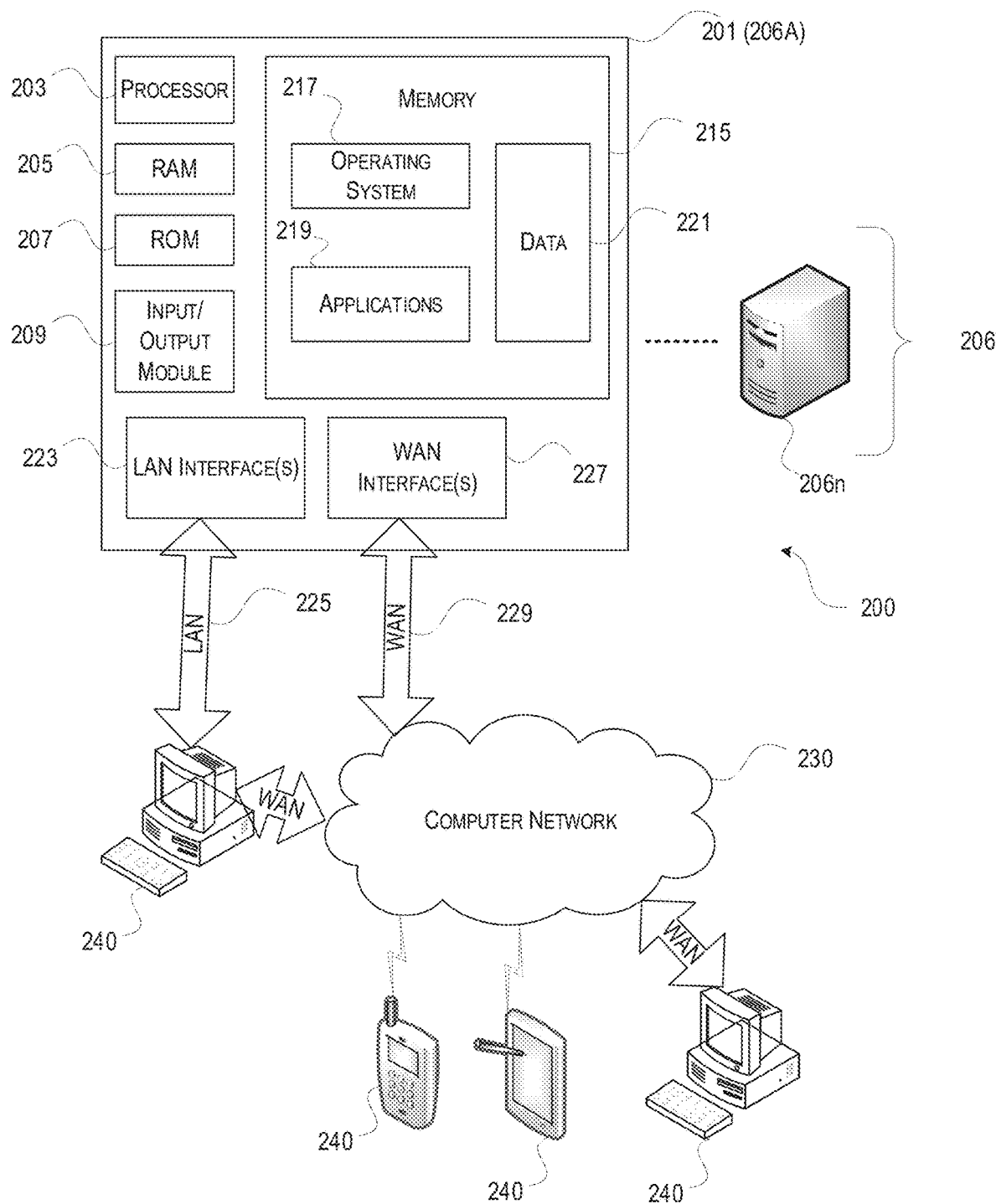
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206*a* in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Florida; or the Remote Desktop Protocol (RDP) manufactured by the Microsoft Corporation of Redmond, Washington.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
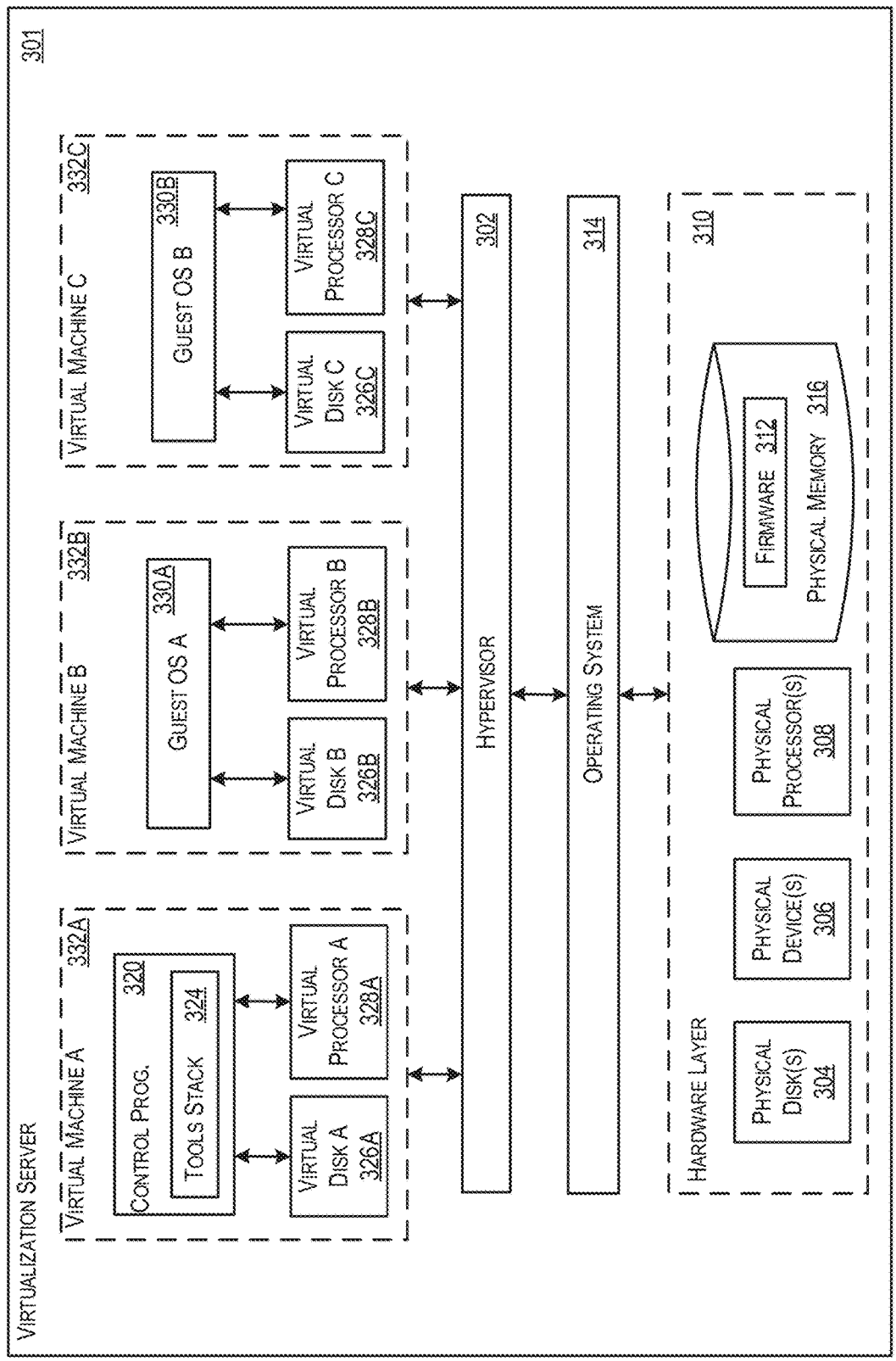
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, California; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, FL.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Figure 4:
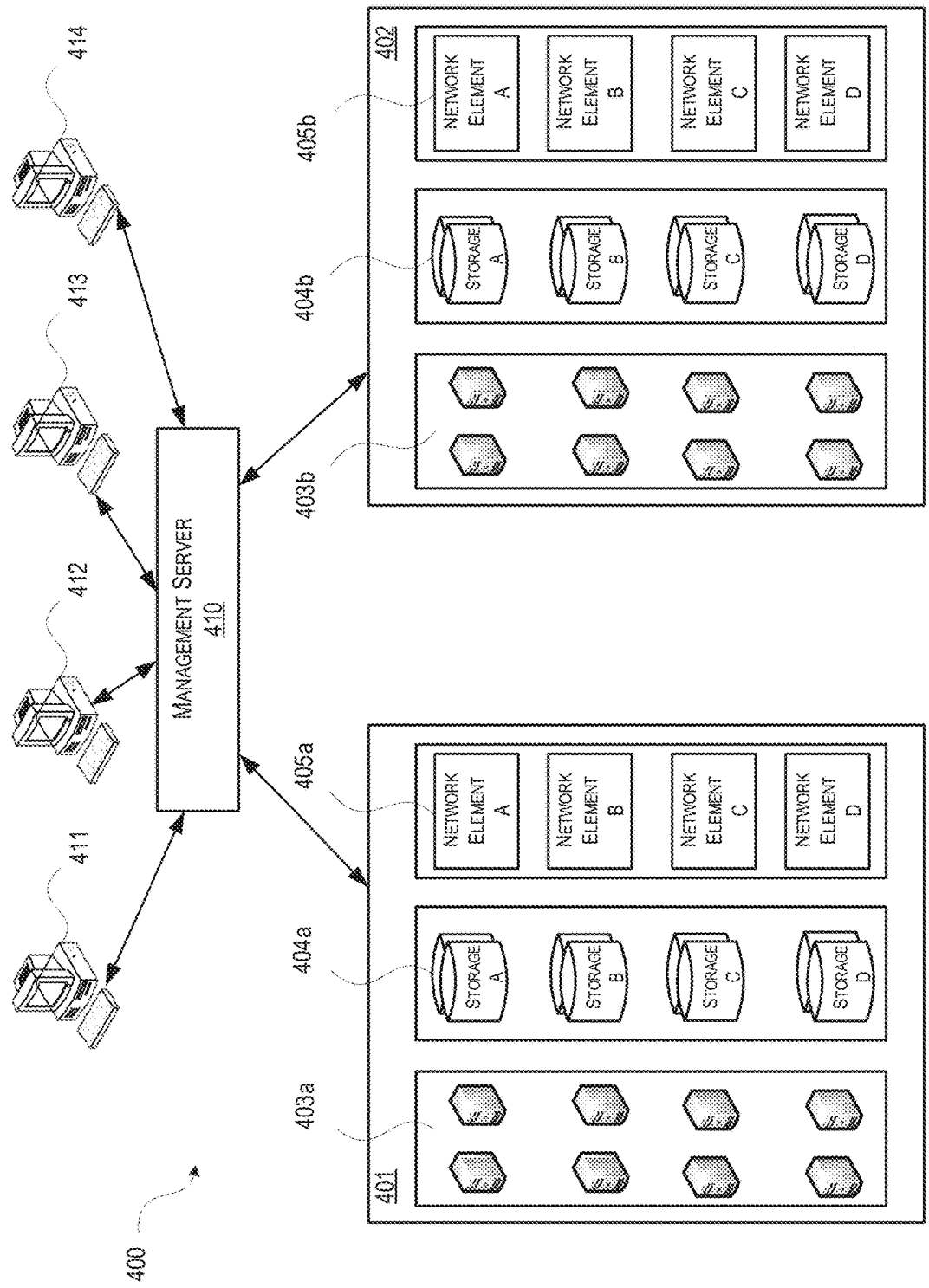
FIG. 4 depicts an illustrative cloud-based system architecture that may be used in accordance with one or more illustrative aspects described herein.

With further reference to FIG. 4, some aspects described herein may be implemented in a cloud-based environment. FIG. 4 illustrates an example of a cloud computing environment (or cloud system) 400. As seen in FIG. 4, client computers 411-414 may communicate with a cloud management server 410 to access the computing resources (e.g., host servers 403a-403b (generally referred herein as "host servers 403"), storage resources 404a-404b (generally referred herein as "storage resources 404"), and network elements 405a-405b (generally referred herein as "network resources 405")) of the cloud system.

Management server 410 may be implemented on one or more physical servers. The management server 410 may run, for example, Citrix Cloud by Citrix Systems, Inc. of Ft. Lauderdale, FL, or OPENSTACK, among others. Management server 410 may manage various computing resources, including cloud hardware and software resources, for example, host computers 403, data storage devices 404, and networking devices 405. The cloud hardware and software resources may include private and/or public components. For example, a cloud may be configured as a private cloud to be used by one or more particular customers or client computers 411-414 and/or over a private network. In other embodiments, public clouds or hybrid public-private clouds may be used by other customers over an open or hybrid networks.

Management server 410 may be configured to provide user interfaces through which cloud operators and cloud customers may interact with the cloud system 400. For example, the management server 410 may provide a set of application programming interfaces (APIs) and/or one or more cloud operator console applications (e.g., web-based or standalone applications) with user interfaces to allow cloud operators to manage the cloud resources, configure the virtualization layer, manage customer accounts, and perform other cloud administration tasks. The management server 410 also may include a set of APIs and/or one or more customer console applications with user interfaces configured to receive cloud computing requests from end users via client computers 411-414, for example, requests to create, modify, or destroy virtual machines within the cloud. Client computers 411-414 may connect to management server 410 via the Internet or some other communication network, and may request access to one or more of the computing resources managed by management server 410. In response to client requests, the management server 410 may include a resource manager configured to select and provision physical resources in the hardware layer of the cloud system based on the client requests. For example, the management server 410 and additional components of the cloud system may be configured to provision, create, and manage virtual machines and their operating environments (e.g., hypervisors, storage resources, services offered by the network elements, etc.) for customers at client computers 411-414, over a network (e.g., the Internet), providing customers with computational resources, data storage services, networking capabilities, and computer platform and application support. Cloud systems also may be configured to provide various specific services, including security systems, development environments, user interfaces, and the like.

Certain clients 411-414 may be related, for example, to different client computers creating virtual machines on behalf of the same end user, or different users affiliated with the same company or organization. In other examples, certain clients 411-414 may be unrelated, such as users affiliated with different companies or organizations. For unrelated clients, information on the virtual machines or storage of any one user may be hidden from other users.

Referring now to the physical hardware layer of a cloud computing environment, availability zones 401-402 (or zones) may refer to a collocated set of physical computing resources. Zones may be geographically separated from other zones in the overall cloud of computing resources. For example, zone 401 may be a first cloud datacenter located in California, and zone 402 may be a second cloud datacenter located in Florida. Management server 410 may be located at one of the availability zones, or at a separate location. Each zone may include an internal network that interfaces with devices that are outside of the zone, such as the management server 410, through a gateway. End users of the cloud (e.g., clients 411-414) might or might not be aware of the distinctions between zones. For example, an end user may request the creation of a virtual machine having a specified amount of memory, processing power, and network capabilities. The management server 410 may respond to the user's request and may allocate the resources to create the virtual machine without the user knowing whether the virtual machine was created using resources from zone 401 or zone 402. In other examples, the cloud system may allow end users to request that virtual machines (or other cloud resources) are allocated in a specific zone or on specific resources 403-405 within a zone.

In this example, each zone 401-402 may include an arrangement of various physical hardware components (or computing resources) 403-405, for example, physical hosting resources (or processing resources), physical network resources, physical storage resources, switches, and additional hardware resources that may be used to provide cloud computing services to customers. The physical hosting resources in a cloud zone 401-402 may include one or more computer servers 403, such as the virtualization servers 301 described above, which may be configured to create and host virtual machine instances. The physical network resources in a cloud zone 401 or 402 may include one or more network elements 405 (e.g., network service providers) comprising hardware and/or software configured to provide a network service to cloud customers, such as firewalls, network address translators, load balancers, virtual private network (VPN) gateways, Dynamic Host Configuration Protocol (DHCP) routers, and the like. The storage resources in the cloud zone 401-402 may include storage disks (e.g., solid state drives (SSDs), magnetic hard disks, etc.) and other storage devices.

The example cloud computing environment shown in FIG. 4 also may include a virtualization layer (e.g., as shown in FIGS. 1-3) with additional hardware and/or software resources configured to create and manage virtual machines and provide other services to customers using the physical resources in the cloud. The virtualization layer may include hypervisors, as described above in FIG. 3, along with other components to provide network virtualizations, storage virtualizations, etc. The virtualization layer may be as a separate layer from the physical resource layer, or may share some or all of the same hardware and/or software resources with the physical resource layer. For example, the virtualization layer may include a hypervisor installed in each of the virtualization servers 403 with the physical computing resources. Known cloud systems may alternatively be used, e.g., WINDOWS AZURE (Microsoft Corporation of Redmond Washington), AMAZON EC2 (Amazon.com Inc. of Seattle, Washington), IBM BLUE CLOUD (IBM Corporation of Armonk, New York), or others.

Enterprise Mobility Management Architecture

Figure 5:
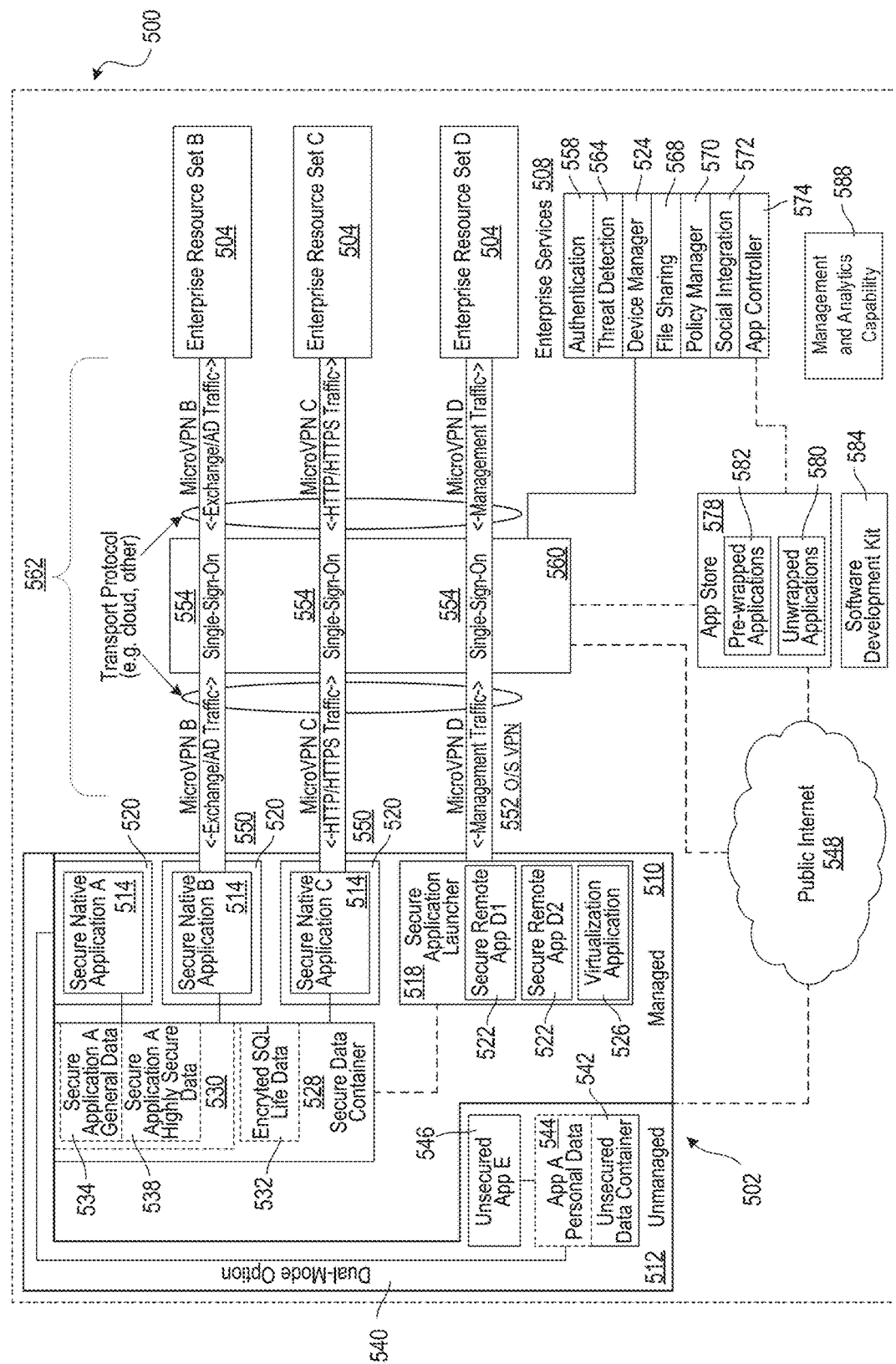
FIG. 5 depicts an illustrative enterprise mobility management system.

FIG. 5 represents an enterprise mobility technical architecture 500 for use in a "Bring Your Own Device" (BYOD) environment. The architecture enables a user of a mobile device 502 to both access enterprise or personal resources from a mobile device 502 and use the mobile device 502 for personal use. The user may access such enterprise resources 504 or enterprise services 508 using a mobile device 502 that is purchased by the user or a mobile device 502 that is provided by the enterprise to the user. The user may utilize the mobile device 502 for business use only or for business and personal use. The mobile device 502 may run an iOS operating system, an Android operating system, or the like. The enterprise may choose to implement policies to manage the mobile device 502. The policies may be implemented through a firewall or gateway in such a way that the mobile device 502 may be identified, secured or security verified, and provided selective or full access to the enterprise resources (e.g., 504 and 508.) The policies may be mobile device management policies, mobile application management policies, mobile data management policies, or some combination of mobile device, application, and data management policies. A mobile device 502 that is managed through the application of mobile device management policies may be referred to as an enrolled device.

In some embodiments, the operating system of the mobile device 502 may be separated into a managed partition 510 and an unmanaged partition 512. The managed partition 510 may have policies applied to it to secure the applications running on and data stored in the managed partition 510. The applications running on the managed partition 510 may be secure applications. In other embodiments, all applications may execute in accordance with a set of one or more policy files received separate from the application, and which define one or more security parameters, features, resource restrictions, and/or other access controls that are enforced by the mobile device management system when that application is executing on the mobile device 502. By operating in accordance with their respective policy file(s), each application may be allowed or restricted from communications with one or more other applications and/or resources, thereby creating a virtual partition. Thus, as used herein, a partition may refer to a physically partitioned portion of memory (physical partition), a logically partitioned portion of memory (logical partition), and/or a virtual partition created as a result of enforcement of one or more policies and/or policy files across multiple applications as described herein (virtual partition). Stated differently, by enforcing policies on managed applications, those applications may be restricted to only be able to communicate with other managed applications and trusted enterprise resources, thereby creating a virtual partition that is not accessible by unmanaged applications and devices.

The secure applications may be email applications, web browsing applications, software-as-a-service (SaaS) access applications, Windows Application access applications, and the like. The secure applications may be secure native applications 514, secure remote applications 522 executed by a secure application launcher 518, virtualization applications 526 executed by a secure application launcher 518, and the like. The secure native applications 514 may be wrapped by a secure application wrapper 520. The secure application wrapper 520 may include integrated policies that are executed on the mobile device 502 when the secure native application 514 is executed on the mobile device 502. The secure application wrapper 520 may include meta-data that points the secure native application 514 running on the mobile device 502 to the resources hosted at the enterprise (e.g., 504 and 508) that the secure native application 514 may require to complete the task requested upon execution of the secure native application 514. The secure remote applications 522 executed by a secure application launcher 518 may be executed within the secure application launcher 518. The virtualization applications 526 executed by a secure application launcher 518 may utilize resources on the mobile device 502, at the enterprise resources 504, and the like. The resources used on the mobile device 502 by the virtualization applications 526 executed by a secure application launcher 518 may include user interaction resources, processing resources, and the like. The user interaction resources may be used to collect and transmit keyboard input, mouse input, camera input, tactile input, audio input, visual input, gesture input, and the like. The processing resources may be used to present a user interface, process data received from the enterprise resources 504, and the like. The resources used at the enterprise resources 504 by the virtualization applications 526 executed by a secure application launcher 518 may include user interface generation resources, processing resources, and the like. The user interface generation resources may be used to assemble a user interface, modify a user interface, refresh a user interface, and the like. The processing resources may be used to create information, read information, update information, delete information, and the like. For example, the virtualization application 526 may record user interactions associated with a graphical user interface (GUI) and communicate them to a server application where the server application will use the user interaction data as an input to the application operating on the server. In such an arrangement, an enterprise may elect to maintain the application on the server side as well as data, files, etc. associated with the application. While an enterprise may elect to "mobilize" some applications in accordance with the principles herein by securing them for deployment on the mobile device 502, this arrangement may also be elected for certain applications. For example, while some applications may be secured for use on the mobile device 502, others might not be prepared or appropriate for deployment on the mobile device 502 so the enterprise may elect to provide the mobile user access to the unprepared applications through virtualization techniques. As another example, the enterprise may have large complex applications with large and complex data sets (e.g., material resource planning applications) where it would be very difficult, or otherwise undesirable, to customize the application for the mobile device 502 so the enterprise may elect to provide access to the application through virtualization techniques. As yet another example, the enterprise may have an application that maintains highly secured data (e.g., human resources data, customer data, engineering data) that may be deemed by the enterprise as too sensitive for even the secured mobile environment so the enterprise may elect to use virtualization techniques to permit mobile access to such applications and data. An enterprise may elect to provide both fully secured and fully functional applications on the mobile device 502 as well as a virtualization application 526 to allow access to applications that are deemed more properly operated on the server side. In an embodiment, the virtualization application 526 may store some data, files, etc. on the mobile device 502 in one of the secure storage locations. An enterprise, for example, may elect to allow certain information to be stored on the mobile device 502 while not permitting other information.

In connection with the virtualization application 526, as described herein, the mobile device 502 may have a virtualization application 526 that is designed to present GUIs and then record user interactions with the GUI. The virtualization application 526 may communicate the user interactions to the server side to be used by the server side application as user interactions with the application. In response, the application on the server side may transmit back to the mobile device 502 a new GUI. For example, the new GUI may be a static page, a dynamic page, an animation, or the like, thereby providing access to remotely located resources.

The secure applications 514 may access data stored in a secure data container 528 in the managed partition 510 of the mobile device 502. The data secured in the secure data container may be accessed by the secure native applications 514, secure remote applications 522 executed by a secure application launcher 518, virtualization applications 526 executed by a secure application launcher 518, and the like. The data stored in the secure data container 528 may include files, databases, and the like. The data stored in the secure data container 528 may include data restricted to a specific secure application 530, shared among secure applications 532, and the like. Data restricted to a secure application may include secure general data 534 and highly secure data 538. Secure general data may use a strong form of encryption such as Advanced Encryption Standard (AES) 128-bit encryption or the like, while highly secure data 538 may use a very strong form of encryption such as AES 256-bit encryption. Data stored in the secure data container 528 may be deleted from the mobile device 502 upon receipt of a command from the device manager 524. The secure applications (e.g., 514, 522, and 526) may have a dual-mode option 540. The dual mode option 540 may present the user with an option to operate the secured application in an unsecured or unmanaged mode. In an unsecured or unmanaged mode, the secure applications may access data stored in an unsecured data container 542 on the unmanaged partition 512 of the mobile device 502. The data stored in an unsecured data container may be personal data 544. The data stored in an unsecured data container 542 may also be accessed by unsecured applications 546 that are running on the unmanaged partition 512 of the mobile device 502. The data stored in an unsecured data container 542 may remain on the mobile device 502 when the data stored in the secure data container 528 is deleted from the mobile device 502. An enterprise may want to delete from the mobile device 502 selected or all data, files, and/or applications owned, licensed or controlled by the enterprise (enterprise data) while leaving or otherwise preserving personal data, files, and/or applications owned, licensed or controlled by the user (personal data). This operation may be referred to as a selective wipe. With the enterprise and personal data arranged in accordance to the aspects described herein, an enterprise may perform a selective wipe.

The mobile device 502 may connect to enterprise resources 504 and enterprise services 508 at an enterprise, to the public Internet 548, and the like. The mobile device 502 may connect to enterprise resources 504 and enterprise services 508 through virtual private network connections. The virtual private network connections, also referred to as microVPN or application-specific VPN, may be specific to particular applications (as illustrated by microVPNs 550, particular devices, particular secured areas on the mobile device (as illustrated by O/S VPN 552), and the like. For example, each of the wrapped applications in the secured area of the mobile device 502 may access enterprise resources through an application specific VPN such that access to the VPN would be granted based on attributes associated with the application, possibly in conjunction with user or device attribute information. The virtual private network connections may carry Microsoft Exchange traffic, Microsoft Active Directory traffic, HyperText Transfer Protocol (HTTP) traffic, HyperText Transfer Protocol Secure (HTTPS) traffic, application management traffic, and the like. The virtual private network connections may support and enable single-sign-on authentication processes 554. The single-sign-on processes may allow a user to provide a single set of authentication credentials, which are then verified by an authentication service 558. The authentication service 558 may then grant to the user access to multiple enterprise resources 504, without requiring the user to provide authentication credentials to each individual enterprise resource 504.

The virtual private network connections may be established and managed by an access gateway 560. The access gateway 560 may include performance enhancement features that manage, accelerate, and improve the delivery of enterprise resources 504 to the mobile device 502. The access gateway 560 may also re-route traffic from the mobile device 502 to the public Internet 548, enabling the mobile device 502 to access publicly available and unsecured applications that run on the public Internet 548. The mobile device 502 may connect to the access gateway via a transport network 562. The transport network 562 may use one or more transport protocols and may be a wired network, wireless network, cloud network, local area network, metropolitan area network, wide area network, public network, private network, and the like.

The enterprise resources 504 may include email servers, file sharing servers, SaaS applications, Web application servers, Windows application servers, and the like. Email servers may include Exchange servers, Lotus Notes servers, and the like. File sharing servers may include ShareFile servers, and the like. SaaS applications may include Salesforce, and the like. Windows application servers may include any application server that is built to provide applications that are intended to run on a local Windows operating system, and the like. The enterprise resources 504 may be premise-based resources, cloud-based resources, and the like. The enterprise resources 504 may be accessed by the mobile device 502 directly or through the access gateway 560. The enterprise resources 504 may be accessed by the mobile device 502 via the transport network 562.

The enterprise services 508 may include authentication services 558, threat detection services 564, device manager services 524, file sharing services 568, policy manager services 570, social integration services 572, application controller services 574, and the like. Authentication services 558 may include user authentication services, device authentication services, application authentication services, data authentication services, and the like. Authentication services 558 may use certificates. The certificates may be stored on the mobile device 502, by the enterprise resources 504, and the like. The certificates stored on the mobile device 502 may be stored in an encrypted location on the mobile device 502, the certificate may be temporarily stored on the mobile device 502 for use at the time of authentication, and the like. Threat detection services 564 may include intrusion detection services, unauthorized access attempt detection services, and the like. Unauthorized access attempt detection services may include unauthorized attempts to access devices, applications, data, and the like. Device management services 524 may include configuration, provisioning, security, support, monitoring, reporting, and decommissioning services. File sharing services 568 may include file management services, file storage services, file collaboration services, and the like. Policy manager services 570 may include device policy manager services, application policy manager services, data policy manager services, and the like. Social integration services 572 may include contact integration services, collaboration services, integration with social networks such as Facebook, Twitter, and LinkedIn, and the like. Application controller services 574 may include management services, provisioning services, deployment services, assignment services, revocation services, wrapping services, and the like.

The enterprise mobility technical architecture 500 may include an application store 578. The application store 578 may include unwrapped applications 580, pre-wrapped applications 582, and the like. Applications may be populated in the application store 578 from the application controller 574. The application store 578 may be accessed by the mobile device 502 through the access gateway 560, through the public Internet 548, or the like. The application store 578 may be provided with an intuitive and easy to use user interface.

A software development kit 584 may provide a user the capability to secure applications selected by the user by wrapping the application as described previously in this description. An application that has been wrapped using the software development kit 584 may then be made available to the mobile device 502 by populating it in the application store 578 using the application controller 574.

The enterprise mobility technical architecture 500 may include a management and analytics capability 588. The management and analytics capability 588 may provide information related to how resources are used, how often resources are used, and the like. Resources may include devices, applications, data, and the like. How resources are used may include which devices download which applications, which applications access which data, and the like. How often resources are used may include how often an application has been downloaded, how many times a specific set of data has been accessed by an application, and the like.

Figure 6:
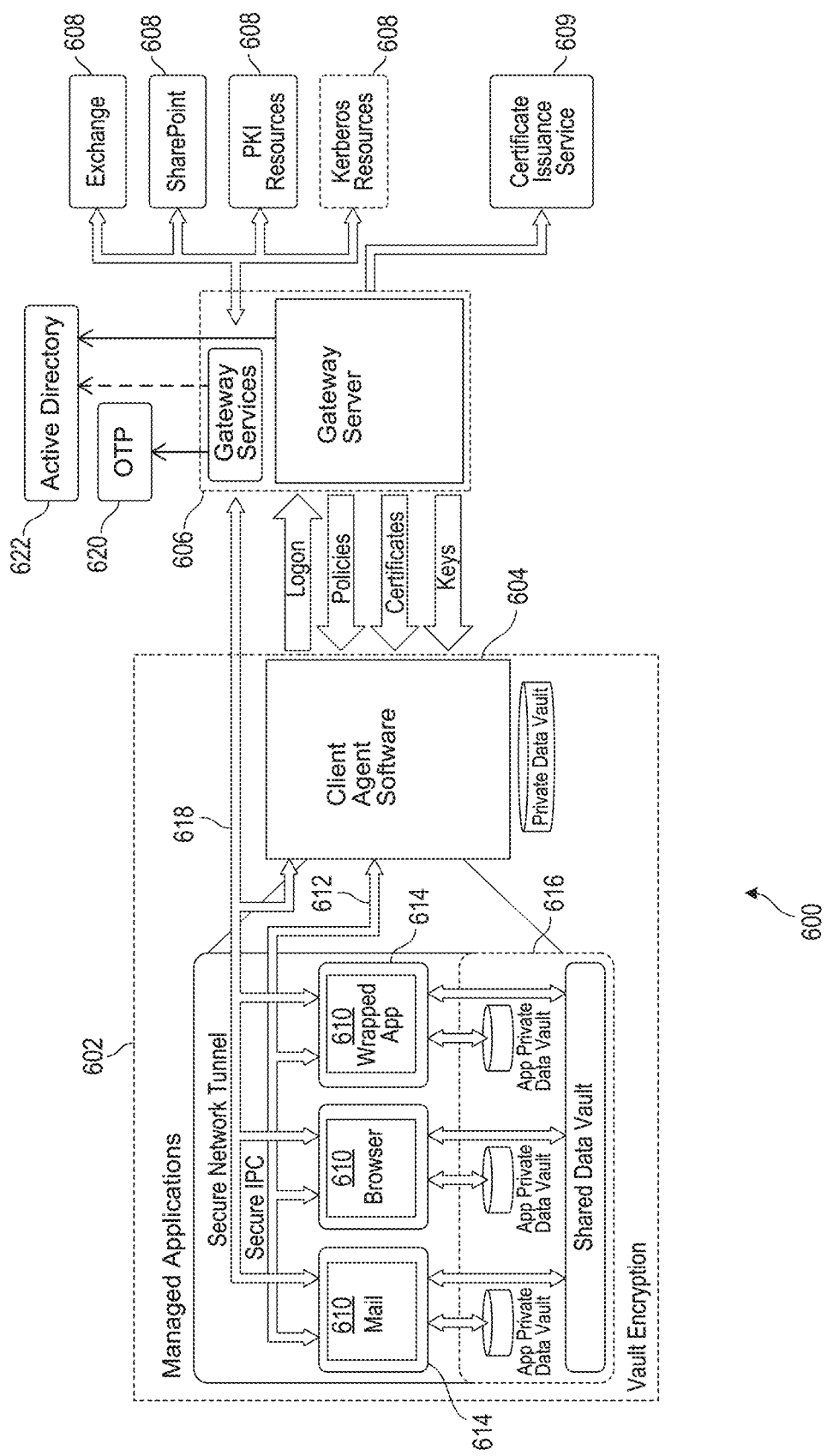
FIG. 6 depicts another illustrative enterprise mobility management system.

FIG. 6 is another illustrative enterprise mobility management system 600. Some of the components of the mobility management system 500 described above with reference to FIG. 5 have been omitted for the sake of simplicity. The architecture of the system 600 depicted in FIG. 6 is similar in many respects to the architecture of the system 500 described above with reference to FIG. 5 and may include additional features not mentioned above.

In this case, the left hand side represents an enrolled mobile device 602 with a client agent 604, which interacts with gateway server 606 (which includes Access Gateway and application controller functionality) to access various enterprise resources 608 and services 609 such as Exchange, Sharepoint, public-key infrastructure (PKI) Resources, Kerberos Resources, Certificate Issuance service, as shown on the right hand side above. Although not specifically shown, the mobile device 602 may also interact with an enterprise application store (StoreFront) for the selection and downloading of applications.

The client agent 604 acts as the UI (user interface) intermediary for Windows apps/desktops hosted in an Enterprise data center, which are accessed using the High-Definition User Experience (HDX)/ICA display remoting protocol. The client agent 604 also supports the installation and management of native applications on the mobile device 602, such as native iOS or Android applications. For example, the managed applications 610 (mail, browser, wrapped application) shown in the figure above are all native applications that execute locally on the mobile device 602. Client agent 604 and application management framework of this architecture act to provide policy driven management capabilities and features such as connectivity and SSO (single sign on) to enterprise resources/services 608. The client agent 604 handles primary user authentication to the enterprise, normally to Access Gateway (AG) 606 with SSO to other gateway server components. The client agent 604 obtains policies from gateway server 606 to control the behavior of the managed applications 610 on the mobile device 602.

The Secure InterProcess Communication (IPC) links 612 between the native applications 610 and client agent 604 represent a management channel, which may allow a client agent to supply policies to be enforced by the application management framework 614 "wrapping" each application. The IPC channel 612 may also allow client agent 604 to supply credential and authentication information that enables connectivity and SSO to enterprise resources 608. Finally, the IPC channel 612 may allow the application management framework 614 to invoke user interface functions implemented by client agent 604, such as online and offline authentication.

Communications between the client agent 604 and gateway server 606 are essentially an extension of the management channel from the application management framework 614 wrapping each native managed application 610. The application management framework 614 may request policy information from client agent 604, which in turn may request it from gateway server 606. The application management framework 614 may request authentication, and client agent 604 may log into the gateway services part of gateway server 606 (for example, Citrix Gateway). Client agent 604 may also call supporting services on gateway server 606, which may produce input material to derive encryption keys for the local data vaults 616, or may provide client certificates which may enable direct authentication to PKI protected resources, as more fully explained below.

In more detail, the application management framework 614 "wraps" each managed application 610. This may be incorporated via an explicit build step, or via a post-build processing step. The application management framework 614 may "pair" with client agent 604 on first launch of an application 610 to initialize the Secure IPC channel 612 and obtain the policy for that application. The application management framework 614 may enforce relevant portions of the policy that apply locally, such as the client agent login dependencies and some of the containment policies that restrict how local OS services may be used, or how they may interact with the managed application 610.

The application management framework 614 may use services provided by client agent 604 over the Secure IPC channel 612 to facilitate authentication and internal network access. Key management for the private and shared data vaults 616 (containers) may be also managed by appropriate interactions between the managed applications 610 and client agent 604. Vaults 616 may be available only after online authentication, or may be made available after offline authentication if allowed by policy. First use of vaults 616 may require online authentication, and offline access may be limited to at most the policy refresh period before online authentication is again required.

Network access to internal resources may occur directly from individual managed applications 610 through Access Gateway 606. The application management framework 614 may be responsible for orchestrating the network access on behalf of each managed application 610. Client agent 604 may facilitate these network connections by providing suitable time limited secondary credentials obtained following online authentication. Multiple modes of network connection may be used, such as reverse web proxy connections and end-to-end VPN-style tunnels 618.

The Mail and Browser managed applications 610 have special status and may make use of facilities that might not be generally available to arbitrary wrapped applications. For example, the Mail application 610 may use a special background network access mechanism that allows it to access an Exchange server 608 over an extended period of time without requiring a full AG logon. The Browser application 610 may use multiple private data vaults 616 to segregate different kinds of data.

This architecture may support the incorporation of various other security features. For example, gateway server 606 (including its gateway services) in some cases may not need to validate active directory (AD) passwords. It can be left to the discretion of an enterprise whether an AD password may be used as an authentication factor for some users in some situations. Different authentication methods may be used if a user is online or offline (i.e., connected or not connected to a network).

Step up authentication is a feature wherein gateway server 606 may identify managed native applications 610 that are allowed to have access to highly classified data requiring strong authentication, and ensure that access to these applications is only permitted after performing appropriate authentication, even if this means a re-authentication is required by the user after a prior weaker level of login.

Another security feature of this solution is the encryption of the data vaults 616 (containers) on the mobile device 602. The vaults 616 may be encrypted so that all on-device data including files, databases, and configurations are protected. For on-line vaults, the keys may be stored on the server (gateway server 606), and for off-line vaults, a local copy of the keys may be protected by a user password or biometric validation. If or when data is stored locally on the mobile device 602 in the secure container 616, it may be preferred that a minimum of AES 256 encryption algorithm be utilized.

Other secure container features may also be implemented. For example, a logging feature may be included, wherein security events happening inside a managed application 610 may be logged and reported to the backend. Data wiping may be supported, such as if or when the managed application 610 detects tampering, associated encryption keys may be written over with random data, leaving no hint on the file system that user data was destroyed. Screenshot protection may be another feature, where an application may prevent any data from being stored in screenshots. For example, the key window's hidden property may be set to YES. This may cause whatever content is currently displayed on the screen to be hidden, resulting in a blank screenshot where any content would normally reside.

Local data transfer may be prevented, such as by preventing any data from being locally transferred outside the application container, e.g., by copying it or sending it to an external application. A keyboard cache feature may operate to disable the autocorrect functionality for sensitive text fields. SSL certificate validation may be operable so the application specifically validates the server SSL certificate instead of it being stored in the keychain. An encryption key generation feature may be used such that the key used to encrypt data on the mobile device 602 is generated using a passphrase or biometric data supplied by the user (if offline access is required). It may be XORed with another key randomly generated and stored on the server side if offline access is not required. Key Derivation functions may operate such that keys generated from the user password use KDFs (key derivation functions, notably Password-Based Key Derivation Function 2 (PBKDF2)) rather than creating a cryptographic hash of it. The latter makes a key susceptible to brute force or dictionary attacks.

Further, one or more initialization vectors may be used in encryption methods. An initialization vector will cause multiple copies of the same encrypted data to yield different cipher text output, preventing both replay and cryptanalytic attacks. This will also prevent an attacker from decrypting any data even with a stolen encryption key. Further, authentication then decryption may be used, wherein application data is decrypted only after the user has authenticated within the application. Another feature may relate to sensitive data in memory, which may be kept in memory (and not in disk) only when it's needed. For example, login credentials may be wiped from memory after login, and encryption keys and other data inside objective-C instance variables are not stored, as they may be easily referenced. Instead, memory may be manually allocated for these.

An inactivity timeout may be implemented, wherein after a policy-defined period of inactivity, a user session is terminated.

Data leakage from the application management framework 614 may be prevented in other ways. For example, if or when a managed application 610 is put in the background, the memory may be cleared after a predetermined (configurable) time period. When backgrounded, a snapshot may be taken of the last displayed screen of the application to fasten the foregrounding process. The screenshot may contain confidential data and hence should be cleared.

Another security feature may relate to the use of an OTP (one time password) 620 without the use of an AD (active directory) 622 password for access to one or more applications. In some cases, some users do not know (or are not permitted to know) their AD password, so these users may authenticate using an OTP 620 such as by using a hardware OTP system like SecurID (OTPs may be provided by different vendors also, such as Entrust or Gemalto). In some cases, after a user authenticates with a user ID, a text may be sent to the user with an OTP 620. In some cases, this may be implemented only for online use, with a prompt being a single field.

An offline password may be implemented for offline authentication for those managed applications 610 for which offline use is permitted via enterprise policy. For example, an enterprise may want StoreFront to be accessed in this manner. In this case, the client agent 604 may require the user to set a custom offline password and the AD password is not used. Gateway server 606 may provide policies to control and enforce password standards with respect to the minimum length, character class composition, and age of passwords, such as described by the standard Windows Server password complexity requirements, although these requirements may be modified.

Another feature may relate to the enablement of a client side certificate for certain applications 610 as secondary credentials (for the purpose of accessing PKI protected web resources via the application management framework micro VPN feature). For example, a managed application 610 may utilize such a certificate. In this case, certificate-based authentication using ActiveSync protocol may be supported, wherein a certificate from the client agent 604 may be retrieved by gateway server 606 and used in a keychain. Each managed application 610 may have one associated client certificate, identified by a label that is defined in gateway server 606.

Gateway server 606 may interact with an enterprise special purpose web service to support the issuance of client certificates to allow relevant managed applications to authenticate to internal PKI protected resources.

The client agent 604 and the application management framework 614 may be enhanced to support obtaining and using client certificates for authentication to internal PKI protected network resources. More than one certificate may be supported, such as to match various levels of security and/or separation requirements. The certificates may be used by the Mail and Browser managed applications 610, and ultimately by arbitrary wrapped applications 610 (provided those applications use web service style communication patterns where it is reasonable for the application management framework to mediate HTTPS requests).

Application management client certificate support on iOS may rely on importing a public-key cryptography standards (PKCS) 12 BLOB (Binary Large Object) into the iOS keychain in each managed application 610 for each period of use. Application management framework client certificate support may use a HTTPS implementation with private in-memory key storage. The client certificate may not be present in the iOS keychain and may not be persisted except potentially in "online-only" data value that is strongly protected.

Mutual SSL or TLS may also be implemented to provide additional security by requiring that a mobile device 602 is authenticated to the enterprise, and vice versa. Virtual smart cards for authentication to gateway server 606 may also be implemented.

Another feature may relate to application container locking and wiping, which may automatically occur upon jailbreak or rooting detections, and occur as a pushed command from administration console, and may include a remote wipe functionality even when a managed application 610 is not running.

A multi-site architecture or configuration of enterprise application store and an application controller may be supported that allows users to be serviced from one of several different locations in case of failure.

In some cases, managed applications 610 may be allowed to access a certificate and private key via an API (for example, OpenSSL). Trusted managed applications 610 of an enterprise may be allowed to perform specific Public Key operations with an application's client certificate and private key. Various use cases may be identified and treated accordingly, such as if or when an application behaves like a browser and no certificate access is required, if or when an application reads a certificate for "who am I," if or when an application uses the certificate to build a secure session token, and if or when an application uses private keys for digital signing of important data (e.g. transaction log) or for temporary data encryption.

Algorithms for High Security One-Time Encryption

Figure 7:
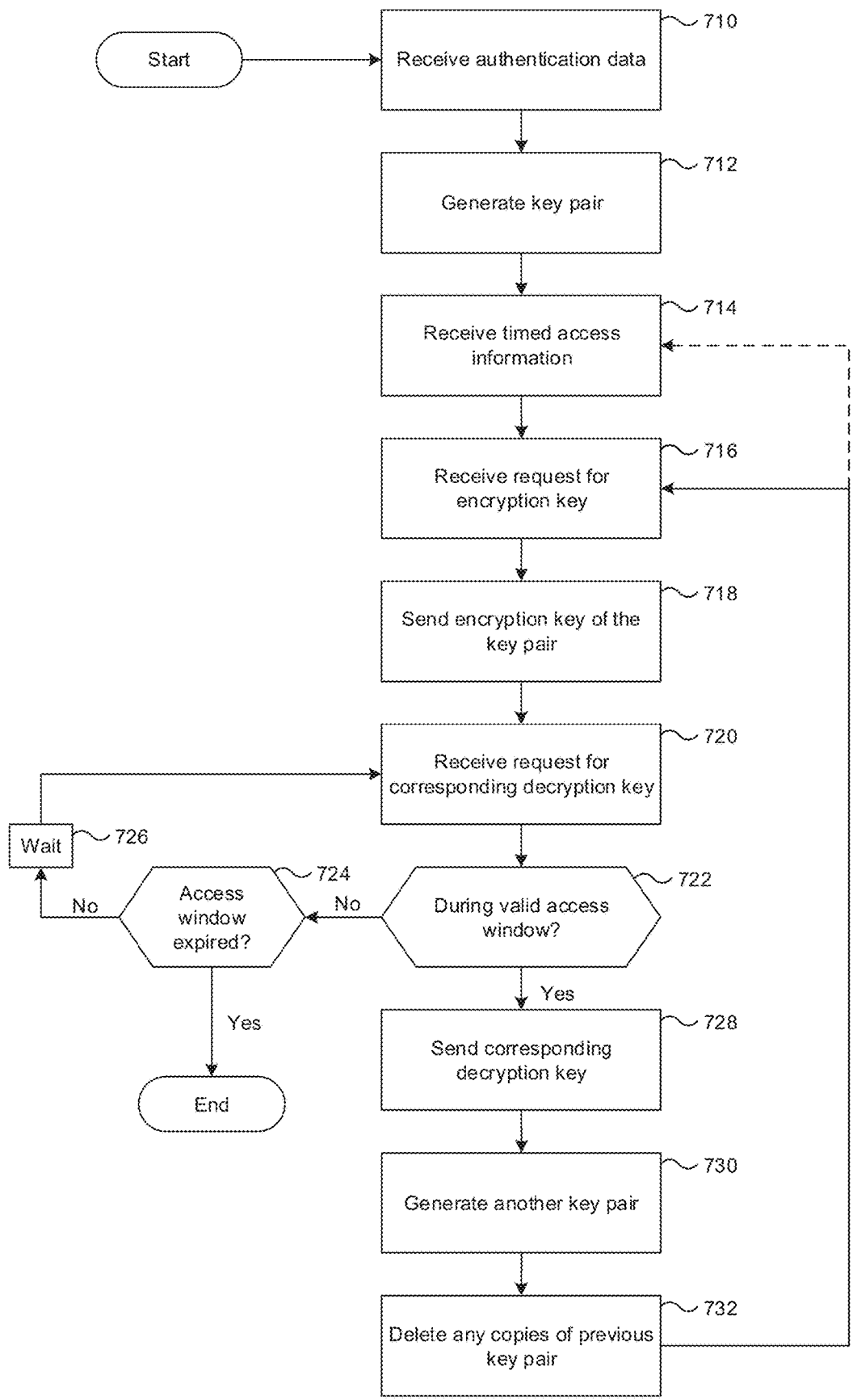
FIG. 7 depicts a flowchart showing an example algorithm for managing security for one or more devices using encryption for use in some implementations.

FIG. 7 depicts a flowchart showing an example algorithm for managing security for one or more devices using encryption for use in some implementations. The method may be implemented or performed, for example, by one or more of the systems as discussed in connection with FIGS. 1-6. The method may be implemented or performed, for example, by one or more computing devices. The steps of the method may be described as being performed by particular components and/or computing devices for the sake of simplicity, but the steps may be performed by any component and/or computing device, or by any combination of one or more components and/or one or more computing devices. The steps of the method may be performed by a single computing device or by multiple computing devices. For example, the steps of the method may be described as being performed by one or more servers (e.g., one or more of servers 206a-206n). One or more steps of the method may be omitted, added, rearranged, and/or otherwise modified as desired by a person of ordinary skill in the art. While the flowchart and descriptions refer to asymmetric cryptography and public key cryptography, one skilled in the art can recognize that the method may be adapted to other cryptography systems such as symmetric key algorithms and the like.

The steps depicted in FIG. 7 may include receiving authentication data by a computing device as described above (710). The computing device may generate a key pair (712). The computing device may receive timed access information (714). The computing device may receive a request for the encryption key of the key pair (716). The computing device may send the encryption key of the key pair in response to the request (718). The computing device may receive a request for the decryption key corresponding to the encryption key of the key pair (720). The computing system may check to see if the request is received during a valid access window (722). If the request is not received during a valid access window, then the algorithm may proceed to check if the access window is expired (724). If the access window is expired, then the algorithm may end. If the access window is not expired, then the algorithm may wait (726) until another request is received for the corresponding decryption key (720). If the request is received during a valid access window, then the algorithm proceeds to send the decryption key corresponding to the encryption key of the key pair (728). The computing device may then generate another key pair (730). The computing device may delete any copies of the previous key pair (732). The computing device may then return to waiting to receive a request for the new encryption key (718). Alternately, the computing device may first receive new timed access information (714) before waiting to receive a request for the new encryption key (718).

Still referring to FIG. 7 and in more detail, the computing device may receive authentication data (710). In some implementations, the computing device is one or more servers receiving authentication data from a client device. The authentication data may authenticate the client device to the one or more servers. In one example, the authentication data may allow access to an account of a user associated with the client device. The authentication data may allow the one or more servers to send data related to cryptography to the client device. For example, the authentication data may comprise a user login and password. After logging in with the user login and password, the client device may be authorized to communicate with the one or more servers to allow access to cryptographic functions available from the one or more servers. Other examples of authentication data known to those skilled in the art may be used. These may include, but are not limited to token based authentication, multi-factor authentication, certificate-based authentication, biometric authentication, and the like.

The computing device may receive may generate a key pair (712). In some implementations, the key pair may be part of an asymmetric or public key cryptography system. The key pair may comprise a public key and a private key generated using cryptographic algorithms for asymmetric cryptography.

The computing device may receive timed access information (714). In some implementations, timed access information comprises data determining one or more windows or slices of time. The one or more windows of time are indicative of when a client device is able to request cryptographic information from the one or more servers. In some implementations, the one or more windows of time or the one or more slices of time are negotiated between the client device and the one or more servers. The one or more windows of time or the one or more slices of time may be based on a clock signal or relative to another point in time. For example, the client device and the one or more servers may both synchronize to an internet time and base the windows of time on the internet time. In another example, the client device and the one or more servers may both synchronize to one or more set amounts of time after the negotiation of time windows has taken place. Other ways to synchronize the one or more windows of time may be used. The duration and number of the one or more windows of time may be dependent on the type of data that is being accessed or the use the data is being put to. For example, the data may only need to be accessed once a day and the one or more windows of time are negotiated to allow access once a day. In another example, the need for access is frequent and continual and a new time window is negotiated every few minutes or even seconds. One or more alternate windows of time may be negotiated as backup windows of time in case one or more other windows of time are missed. When there are a plurality of servers, the one or more windows of time may be negotiated with all or a subset of the plurality of servers. In some implementations, the one or more windows of time negotiated with all or a subset of the plurality of servers may be identical. In some implementations, the one or more windows of time negotiated with all or a subset of the plurality of servers may have some or all the one or more windows of time be different depending on the respective server of the plurality of servers.

The computing device may receive a request for the encryption key of the key pair (716). In some implementations, the encryption key is one of the keys from the key pair. The ability to receive the request may be based on successful authentication of the client device and/or a user of the client device.

The computing device may send the encryption key of the key pair in response to the request (718). In some implementations, the encryption key is one of the keys from the key pair. In some implementations, the encryption key may only be sent if the request is received during one of the negotiated windows of time. In some implementations, the encryption key may be sent without consideration of any negotiated windows of time. In some implementations, the initial encryption key for use by the client device may be sent outside of any negotiated windows of time, but any future encryption keys must be within one of the negotiated windows of time.

The computing device may receive a request for the decryption key corresponding to the encryption key of the key pair (720). In some implementations, the encryption key is the public key of a public/private key pair using asymmetric encryption and the corresponding decryption key is the private key of the public/private key pair. In some implementations, the encryption key is the private key of a public/private key pair using asymmetric encryption and the corresponding decryption key is the public key of the public/private key pair.

The computing system may check to see if the request is received during a valid access window (722). In some implementations, a valid access window is a time that is within one of the negotiated windows of time.

If the request is not received during a valid access window (722:NO), then the algorithm may proceed to check if the access window is expired (724). If the access window is expired, then the algorithm may end. In some implementations, once an access window has expired (i.e., all valid time windows have been missed), the algorithm ends. In some implementations, there is no further opportunity for the client device to access the still encrypted data. If the access window is not expired, then the algorithm may wait (726) until another request is received for the corresponding decryption key (720). The access window may not be expired because the request was received too early. The access window may also not be expired because while one or more windows of time have been missed, there are still negotiated valid time windows in the future. In some implementations, there may be consequences for a request that is received before a valid time window even if there is still a valid window in the future. For example, the request may not be honored during the next valid time window, but an opportunity is provided to the client device to reauthenticate and negotiate new time windows.

If the request is received during a valid access window (722:YES), then the algorithm proceeds to send the decryption key corresponding to the encryption key of the key pair (728). In some implementations, the decryption key is the private key of a public/private key pair using asymmetric encryption and the corresponding encryption key is the public key of the public/private key pair. Other decryption keys and encryption keys may be applicable to those skilled in the art.

The computing device may then generate another key pair (730). In some implementations, the key pair may be part of an asymmetric or public key cryptography system. The key pair may comprise a public key and a private key generated using cryptographic algorithms for asymmetric cryptography. The new key pair is different than the previous key pair and generated independently. The computing device may delete any copies of the previous key pair (732).

The computing device may then return to waiting to receive a request for the new encryption key (718). Alternately, the computing device may first receive new timed access information (714) before waiting to receive a request for the new encryption key (718).

In some implementations, where a plurality of windows of time are determined or negotiated, a different encryption key set may be associated with each of the windows of time. If any of the key sets are utilized with any of the associated windows of time, all the key sets may have to be refreshed and new ones generated for the next plurality of windows of time.

In some implementations, the client device may be locked out of authentication if the one or more servers has been notified that the client device has been compromised and/or that the authentication data has been compromised. In one example, upon notification of a client device being compromised, the one or more servers may prevent the client device and/or a user associated with the compromised hardware from authenticating on the one or more server. In another example, the one or more servers may delete all associated decryption keys if notification is received that a client device has been compromised and/or that the authentication data has been compromised.

Figure 8:
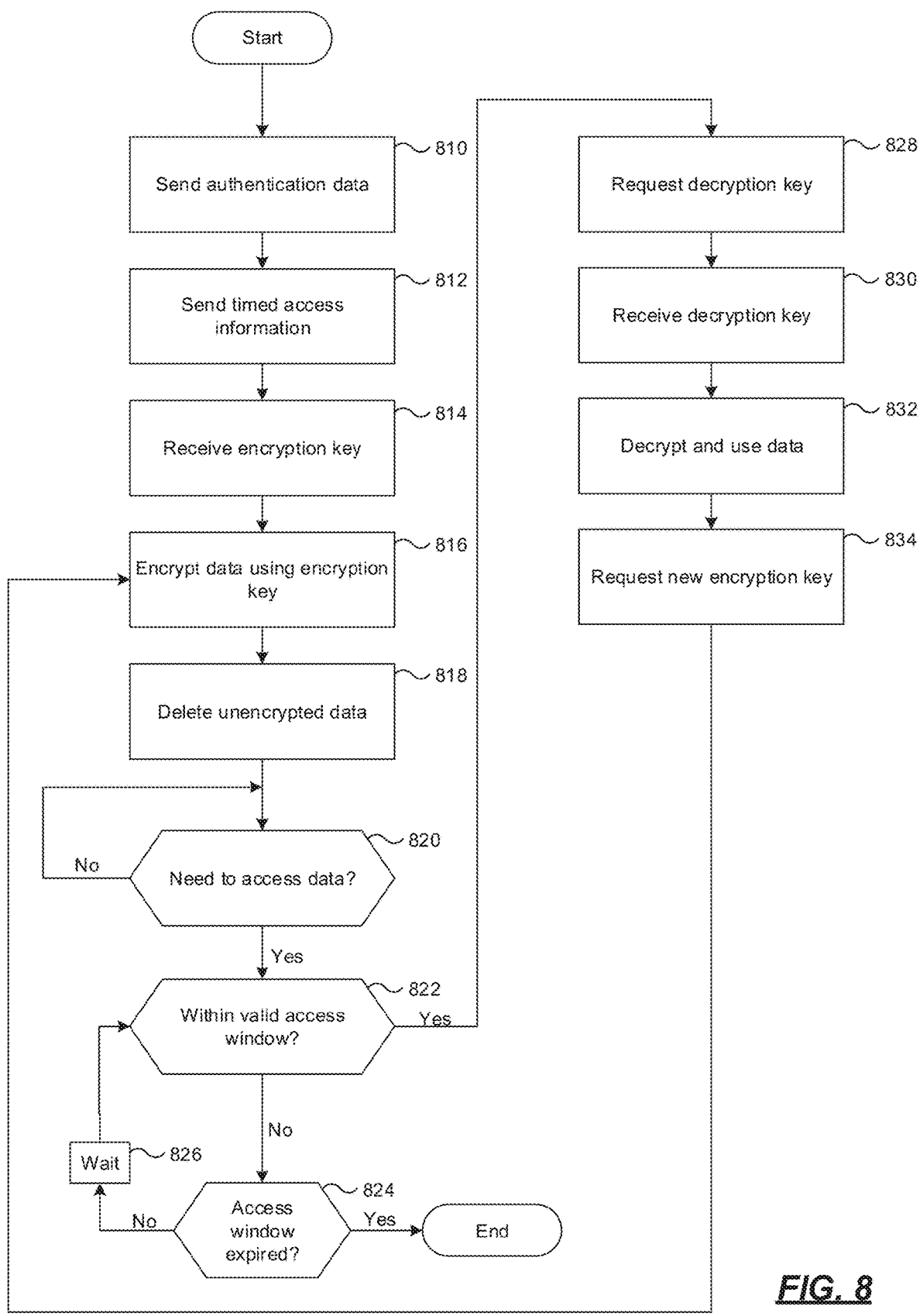
FIG. 8 depicts a flowchart showing an example algorithm for receiving security management using encryption for use in some implementations.

FIG. 8 depicts a flowchart showing an example algorithm for receiving security management using encryption for use in some implementations. The method may be implemented or performed, for example, by one or more of the systems as discussed in connection with FIGS. 1-6. The method may be implemented or performed, for example, by one or more computing devices. The steps of the method may be described as being performed by particular components and/or computing devices for the sake of simplicity, but the steps may be performed by any component and/or computing device, or by any combination of one or more components and/or one or more computing devices. The steps of the method may be performed by a single computing device or by multiple computing devices. For example, the steps of the method may be described as being performed by one or more client devices or terminals (e.g., one or more of client devices 240). One or more steps of the method may be omitted, added, rearranged, and/or otherwise modified as desired by a person of ordinary skill in the art. While the flowchart and descriptions refer to asymmetric cryptography and public key cryptography, one skilled in the art can recognize that the method may be adapted to other cryptography systems such as symmetric key algorithms and the like.

The steps depicted in FIG. 8 may include sending authentication data by a computing device as described above (810). The computing device may send timed access information (812). The computing device may receive an encryption key (814). The computing device may encrypt data using the received encryption key (816). The computing device may delete all unencrypted data used to create the encrypted data (818). The computing device may make a determination that the encrypted data needs to be accessed (820). If there is no need to access the data, the algorithm may wait until there is a need to access the data. If there is a need to access the data, the algorithm may proceed to check if the time is within a valid access window (822). If the time is not within a valid access window, the algorithm may proceed to check if the access window is expired (824). If the access window is expired, then the algorithm may end. If the access window is not expired, then the algorithm may wait (826) until a time of a valid access window is reached. If the time is within a valid access window, the computing device may proceed to request a decryption key (828). The computing device may receive the decryption key (830). The computing device may use the decryption key to decrypt and use data (832). The computing device may then proceed to request a new encryption key (834). The computing device may then proceed back to encrypting the data using the new encryption key (816).

Still referring to FIG. 8 and in more detail, the computing device (e.g., a client device) may send authentication data (810). In some implementations, the computing device is a client device sending authentication data to one or more servers. The authentication data may authenticate the computing device to the one or more servers. In one example, the authentication data may allow access to an account of a user associated with the computing device residing or executing on the one or more servers. The authentication data may allow the computing device to request timed window cryptography services from the one or more servers and receive data related to cryptography by the computing device. For example, the authentication data may comprise a user login and password. After logging in with the user login and password, the computing device may be authorized to communicate with the one or more servers to allow access to cryptographic functions available from the one or more servers. Other examples of authentication data known to those skilled in the art may be used. These may include, but are not limited to token-based authentication, multi-factor authentication, certificate-based authentication, biometric authentication, and the like.

The client device may send timed access information (812). In some implementations, timed access information comprises data determining one or more windows or slices of time. The one or more windows of time are indicative of when a client device is able to request cryptographic information from the one or more servers. In some implementations, the one or more windows of time or the one or more slices of time are negotiated between the client device and the one or more servers. The one or more windows of time or the one or more slices of time may be based on a clock signal or relative to another point in time. For example, the client device and the one or more servers may both synchronize to an internet time and base the windows of time on the internet time. In another example, the client device and the one or more servers may both synchronize to one or more set amounts of time after the negotiation of time windows has taken place. Other way to synchronize the one or more windows of time may be used. The duration and number of the one or more windows of time may be dependent on the type of data that is being accessed or the use the data is being put to. For example, the data may only need to be accessed once a day and the one or more windows of time are negotiated to allow access once a day. In another example, the need for access is frequent and continual and a new time window is negotiated every few minutes or even seconds. One or more alternate windows of time may be negotiated as backup windows of time in case one or more other windows of time are missed.

The client device may receive an encryption key (814). In some implementations, the received encryption key is from one of the one or more servers. The encryption key may be received after a request sent by the client device for an encryption key. In some implementations, the encryption key is one of the keys from a key pair generated by one of the one or more servers.

The client device may encrypt data using the received encryption key (816). In some implementations, the client device may be using partitioned memory and/or disk storage space to keep data being protected by the encryption method separate from other data on the client device. The encrypted data may also be stored on remote storage devices as discussed in this paper. The encrypted data may also be used and/or part of a virtualization system or as part of one or more virtual machines. In some implementations, the client device itself may be a virtual machine. In some implementations, the client device may be operating as or as part of a cloud based environment. In some implementations, the encrypted data may be used as enterprise resources on a personal device. The device management properties may require the high level of encryption when using or interacting with enterprise resources. For example, the managed partition may include requirements to use the high level of encryption on some or al the data within the managed partition.

The client device may delete all unencrypted data used to create the encrypted data (818). In some implementations, a confirmation of encrypted data validity is communicated between the client device and the one or more servers prior to deletion of all unencrypted data.

The client device may make a determination that the encrypted data needs to be accessed (820). In some examples, this may be on an ad hoc basis when the data is requested by a user or program running on the client device. In some examples, the data may need to be accessed on some regular interval or at a predictable time.

If there is no need to access the data (820:NO), the algorithm may wait until there is a need to access the data. If there is a need to access the data (820:YES), the algorithm may proceed to check if the time is within a valid access window (822). In some implementations, a valid access window is a time that is within one of the negotiated windows of time.

If the time is not within a valid access window (822:NO), the algorithm may proceed to check if the access window is expired (824). If the access window is expired (824:YES), then the algorithm may end. In some implementations, once an access window has expired (i.e., all valid time windows have been missed), the algorithm ends. In some implementations, there is no further opportunity for the client device to access the still encrypted data. If the access window is not expired (824:NO), then the algorithm may wait (826) until a valid time window has been reached. The access window may not be expired because the attempt to access encrypted data was too early. The access window may also not be expired because while one or more windows of time have been missed, there are still negotiated valid time windows in the future.

If the time is within a valid access window (822:YES), the client device may proceed to request a decryption key (828). In some implementations, the request is sent to the one or more servers.

The client device may receive the decryption key (830). Then the algorithm proceeds to send the decryption key corresponding to the encryption key of the key pair (728). In some implementations, the decryption key is the private key of a public/private key pair using asymmetric encryption and the corresponding encryption key is the public key of the public/private key pair. Other decryption keys and encryption keys may be applicable to those skilled in the art.

The client device may use the decryption key to decrypt and use data (832). The encrypted data may be the data that was previously encrypted with the corresponding encryption key.

The client device may then proceed to request a new encryption key (834). In some implementations, the encryption key is a newly generated key generated by one of the one or more servers. The client device may then proceed back to encrypting the data using the new encryption key (816).

In some implementations, the client device may be using a plurality of servers for this method of encrypting critical data. For example, the client device may be using two servers with two configurations. The client device is communicating with each respective server to encrypt the data twice, using keys from both servers. This may be expanded to communicating with a plurality of servers and encrypting the data a plurality of times. In another example, the client device may encrypt two copies of the data in parallel using the keys from two servers. In this manner, if one of the servers was inoperable or inaccessible for some reason, the data would still be accessible during the negotiated window of time. This may be expanded to encrypting a plurality of copies of the data in parallel using keys from a plurality of servers. In another example a plurality of servers may be used, such that one or more servers are accessed and communicated with for normal use and that one or more other servers are accessed and communicated with for emergency use. The emergency use servers may only be used if something goes awry in accessing the normal use servers. The time windows negotiated with the emergency servers may be different than the normal use servers. For example, the time windows may be further apart and/or or further in the future for the emergency use servers.

The following paragraphs (M1) through (M7) describe examples of methods that may be implemented in accordance with the present disclosure.

(M1) A method, executing on a computing device, comprising: receiving, from a client device, authentication data; generating an encryption key and a corresponding decryption key; receiving, from the client device, information associated with a timed access window; sending, to the client device, the encryption key; receiving, from the client device, a request for the corresponding decryption key; calculating that the request for the corresponding decryption key is during the timed access window; and sending, to the client device, based on the request and the calculation that the request for the corresponding decryption key is during the timed access window, the corresponding decryption key.

(M2) A method may be performed as described in paragraph (M1) further comprising: based on sending the corresponding decryption key: generating a second encryption key and a corresponding second decryption key; sending, to the client device, the second encryption key; and deleting any remaining copies of the encryption key and the corresponding decryption key from short term memory and long term storage of the computing device; and receiving, from the client device, information associated with a second timed access window.

(M3) A method may be performed as described in any of paragraphs (M1) through (M2) wherein the timed access window is negotiated between the computing device and the client device.

(M4) A method may be performed as described in any of paragraphs (M1) through (M3) further comprising deleting any remaining copies of the encryption key after expiration of the timed access window.

(M5) A method may be performed as described in any of paragraphs (M1) through (M4) wherein (a) a plurality of timed access windows, including the timed access window, are negotiated between the computing device and the client device, (b) the plurality of timed access windows associated with a same set of data, and (c) the computing device is configured to accept the request for the corresponding decryption key during any of the plurality of timed access windows.

(M6) A method may be performed as described in any of paragraphs (M1) through (M5) wherein (a) a plurality of corresponding sets of encryption keys and decryption keys, including the encryption key and the corresponding decryption key, are generated by the computing device and (b) the plurality of corresponding sets of encryption keys and decryption keys, are associated with a same set of data.

(M7) A method may be performed as described in any of paragraphs (M1) through (M6) further comprising: based on sending the corresponding decryption key, deleting any remaining copies of the plurality of corresponding sets of encryption keys and decryption keys from short term memory and long term storage of the computing device.

The following paragraphs (A1) through (A7) describe examples of computing devices that may be implemented in accordance with the present disclosure.

(A1) A computing device comprising: one or more processors; and memory storing instructions that, when executed by the one or more processors, cause the computing device to: receive, from a client device, authentication data; generate an encryption key and a corresponding decryption key; receive, from the client device, information associated with a timed access window; send, to the client device, the encryption key; receive, from the client device, a request for the corresponding decryption key; and calculate that the request for the corresponding decryption key is during the timed access window; and send, to the client device, based on the request and the calculation that the request for the corresponding decryption key is during the timed access window, the corresponding decryption key.

(A2) A computing device may be implemented as described in paragraph (A1), the memory further storing instructions that, when executed by the one or more processors, cause the computing device to: based on sending the corresponding decryption key: generate a second encryption key and a corresponding second decryption key; send, to the client device, the second encryption key; and delete any remaining copies of the encryption key and the corresponding decryption key from short term memory and long term storage of the computing device; and receive, from the client device, information associated with a second timed access window.

(A3) A computing device may be performed as described in any of paragraphs (A1) through (A2) wherein the timed access window is negotiated between the computing device and the client device.

(A4) A computing device may be performed as described in any of paragraphs (A1) through (A3), the memory further storing instructions that, when executed by the one or more processors, cause the computing device to delete any remaining copies of the encryption key after expiration of the timed access window.

(A5) A computing device may be performed as described in any of paragraphs (A1) through (A4) wherein (a) a plurality of timed access windows, including the timed access window, are negotiated between the computing device and the client device, (b) the plurality of timed access windows are associated with a same set of data, and (c) the computing device is configured to accept the request for the corresponding decryption key during any of the plurality of timed access windows.

(A6) A computing device may be performed as described in any of paragraphs (A1) through (A5) wherein (a) a plurality of corresponding sets of encryption keys and decryption keys, including the encryption key and the corresponding decryption key, are generated by the computing device and (b) the plurality of corresponding sets of encryption keys and decryption keys, are associated with a same set of data.

(A7) A computing device may be performed as described in any of paragraphs (A1) through (A6), the memory further storing instructions that, when executed by the one or more processors, cause the computing device to: based on sending the corresponding decryption key, delete any remaining copies of the plurality of corresponding sets of encryption keys and decryption keys from short term memory and long term storage of the computing device.

The following paragraphs (CRM1) through (CRM6) describe examples of computer-readable media that may be implemented in accordance with the present disclosure.

(CRM1) A non-transitory computer-readable medium storing instructions that, when executed, cause a computing device to: receive, from a client device, authentication data; generate an encryption key and a corresponding decryption key; receive, from the client device, information associated with a timed access window; send, to the client device, the encryption key; receive, from the client device, a request for the corresponding decryption key; calculate that the request for the corresponding decryption key is during the timed access window; and send, to the client device, based on the request and the calculation that the request for the corresponding decryption key is during the timed access window, the corresponding decryption key.

(CRM2) A non-transitory computer-readable medium may be implemented as described in paragraph (CRM1), further storing instructions that, when executed, cause the computing device to: based on sending the corresponding decryption key: generate a second encryption key and a corresponding second decryption key; send, to the client device, the second encryption key; and delete any remaining copies of the encryption key and the corresponding decryption key from short term memory and long term storage of the computing device; and receive, from the client device, information associated with a second timed access window.

(CRM3) A non-transitory computer-readable medium may be implemented as described in any of paragraphs (CRM1) through (CRM2), wherein the timed access window is negotiated between the computing device and the client device.

(CRM4) A non-transitory computer-readable medium may be implemented as described in any of paragraphs (CRM1) through (CRM3), further storing instructions that, when executed, cause the computing device to delete any remaining copies of the encryption key after expiration of the timed access window.

(CRM5) A non-transitory computer-readable medium may be implemented as described in any of paragraphs (CRM1) through (CRM4), wherein (a) a plurality of timed access windows, including the timed access window, are negotiated between the computing device and the client device, (b) the plurality of timed access windows are associated with a same set of data, and (c) the computing device is configured to accept the request for the corresponding decryption key during any of the plurality of timed access windows.

(CRM6) A non-transitory computer-readable medium may be implemented as described in any of paragraphs (CRM1) through (CRM5), wherein (a) a plurality of corresponding sets of encryption keys and decryption keys, including the encryption key and the corresponding decryption key, are generated by the computing device, (b) the plurality of corresponding sets of encryption keys and decryption keys, are associated with a same set of data, and (c) the one or more non-transitory computer-readable media further storing instructions that, when executed, cause the computing device to: based on sending the corresponding decryption key, delete any remaining copies of the plurality of corresponding sets of encryption keys and decryption keys from short term memory and long term storage of the computing device.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, executing on a computing device, comprising:
   receiving, from a client device, authentication data;
   generating an encryption key and a corresponding decryption key;
   receiving, from the client device, information associated with a timed access window;
   sending, to the client device, the encryption key;
   receiving, from the client device, a request for the corresponding decryption key;
   calculating that the request for the corresponding decryption key is during the timed access window; and
   sending, to the client device, based on the request and the calculation that the request for the corresponding decryption key is during the timed access window, the corresponding decryption key without a corresponding encrypted data.

2. The method of claim 1, further comprising:
   (a) based on sending the corresponding decryption key:
       generating a second encryption key and a corresponding second decryption key;
       sending, to the client device, the second encryption key; and
       deleting any remaining copies of the encryption key and the corresponding decryption key from short term memory and long term storage of the computing device; and
   (b) receiving, from the client device, information associated with a second timed access window.

3. The method of claim 1, wherein the timed access window is negotiated between the computing device and the client device.

4. The method of claim 1, further comprising deleting any remaining copies of the encryption key after expiration of the timed access window.

5. The method of claim 1, wherein (a) a plurality of timed access windows, including the timed access window, are negotiated between the computing device and the client device, (b) the plurality of timed access windows associated with a same set of data, and (c) the computing device is configured to accept the request for the corresponding decryption key during any of the plurality of timed access windows.

6. The method of claim 1, wherein (a) a plurality of corresponding sets of encryption keys and decryption keys, including the encryption key and the corresponding decryption key, are generated by the computing device and (b) the plurality of corresponding sets of encryption keys and decryption keys, are associated with a same set of data.

7. The method of claim 6, further comprising: based on sending the corresponding decryption key, deleting any remaining copies of the plurality of corresponding sets of encryption keys and decryption keys from short term memory and long term storage of the computing device.

8. A computing device comprising:
   one or more processors; and
   memory storing instructions that, when executed by the one or more processors, cause the computing device to:
       receive, from a client device, authentication data;
       generate an encryption key and a corresponding decryption key;
       receive, from the client device, information associated with a timed access window;
       send, to the client device, the encryption key;
       receive, from the client device, a request for the corresponding decryption key;

calculate that the request for the corresponding decryption key is during the timed access window; and send, to the client device, based on the request and the calculation that the request for the corresponding decryption key is during the timed access window, the corresponding decryption key without a corresponding encrypted data.

9. The computing device of claim 8, the memory further storing instructions that, when executed by the one or more processors, cause the computing device to:
  (a) based on sending the corresponding decryption key:
    generate a second encryption key and a corresponding second decryption key;
    send, to the client device, the second encryption key; and
    delete any remaining copies of the encryption key and the corresponding decryption key from short term memory and long term storage of the computing device; and
  (b) receive, from the client device, information associated with a second timed access window.

10. The computing device of claim 8, wherein the timed access window is negotiated between the computing device and the client device.

11. The computing device of claim 8, the memory further storing instructions that, when executed by the one or more processors, cause the computing device to delete any remaining copies of the encryption key after expiration of the timed access window.

12. The computing device of claim 8, wherein (a) a plurality of timed access windows, including the timed access window, are negotiated between the computing device and the client device, (b) the plurality of timed access windows are associated with a same set of data, and (c) the computing device is configured to accept the request for the corresponding decryption key during any of the plurality of timed access windows.

13. The computing device of claim 8, wherein (a) a plurality of corresponding sets of encryption keys and decryption keys, including the encryption key and the corresponding decryption key, are generated by the computing device and (b) the plurality of corresponding sets of encryption keys and decryption keys, are associated with a same set of data.

14. The computing device of claim 13, the memory further storing instructions that, when executed by the one or more processors, cause the computing device to: based on sending the corresponding decryption key, delete any remaining copies of the plurality of corresponding sets of encryption keys and decryption keys from short term memory and long term storage of the computing device.

15. One or more non-transitory computer-readable media storing instructions that, when executed, cause a computing device to:
  receive, from a client device, authentication data;
  generate an encryption key and a corresponding decryption key;
  receive, from the client device, information associated with a timed access window;
  send, to the client device, the encryption key;
  receive, from the client device, a request for the corresponding decryption key;
  calculate that the request for the corresponding decryption key is during the timed access window; and
  send, to the client device, based on the request and the calculation that the request for the corresponding decryption key is during the timed access window, the corresponding decryption key without a corresponding encrypted data.

16. The one or more non-transitory computer-readable media of claim 15, further storing instructions that, when executed, cause the computing device to:
  (a) based on sending the corresponding decryption key:
    generate a second encryption key and a corresponding second decryption key;
    send, to the client device, the second encryption key; and
    delete any remaining copies of the encryption key and the corresponding decryption key from short term memory and long term storage of the computing device; and
  (b) receive, from the client device, information associated with a second timed access window.

17. The one or more non-transitory computer-readable media of claim 15, wherein the timed access window is negotiated between the computing device and the client device.

18. The one or more non-transitory computer-readable media of claim 15, further storing instructions that, when executed, cause the computing device to delete any remaining copies of the encryption key after expiration of the timed access window.

19. The one or more non-transitory computer-readable media of claim 15, wherein (a) a plurality of timed access windows, including the timed access window, are negotiated between the computing device and the client device, (b) the plurality of timed access windows are associated with a same set of data, and (c) the computing device is configured to accept the request for the corresponding decryption key during any of the plurality of timed access windows.

20. The one or more non-transitory computer-readable media of claim 15, wherein (a) a plurality of corresponding sets of encryption keys and decryption keys, including the encryption key and the corresponding decryption key, are generated by the computing device, (b) the plurality of corresponding sets of encryption keys and decryption keys, are associated with a same set of data, and (c) the one or more non-transitory computer-readable media further storing instructions that, when executed, cause the computing device to: based on sending the corresponding decryption key, delete any remaining copies of the plurality of corresponding sets of encryption keys and decryption keys from short term memory and long term storage of the computing device.

* * * * *